United States Patent
Gardiner

(10) Patent No.: US 7,142,767 B2
(45) Date of Patent: Nov. 28, 2006

(54) SCRATCH-RESISTANT LIGHT DIRECTING FILMS

(75) Inventor: Mark E. Gardiner, Santa Rosa, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 211 days.

(21) Appl. No.: 10/750,328

(22) Filed: Dec. 31, 2003

(65) Prior Publication Data

US 2005/0147374 A1 Jul. 7, 2005

(51) Int. Cl.
*G02B 6/10* (2006.01)

(52) U.S. Cl. .......................................... 385/146; 353/33

(58) Field of Classification Search ................. 385/146
See application file for complete search history.

(56) References Cited

U.S. PATENT DOCUMENTS

| | | | | |
|---|---|---|---|---|
| 3,810,804 A | * | 5/1974 | Rowland | 156/245 |
| 4,101,324 A | * | 7/1978 | Mizuno et al. | 430/306 |
| 5,122,902 A | * | 6/1992 | Benson | 359/529 |
| 5,467,208 A | * | 11/1995 | Kokawa et al. | 349/67 |
| 5,614,286 A | | 3/1997 | Bacon | |
| 5,657,408 A | * | 8/1997 | Ferm et al. | 385/43 |
| 5,696,627 A | * | 12/1997 | Benson et al. | 359/529 |
| 5,771,328 A | * | 6/1998 | Wortman et al. | 385/146 |
| 5,919,551 A | | 7/1999 | Cobb, Jr. et al. | |
| 6,021,559 A | * | 2/2000 | Smith | 29/557 |
| 6,080,340 A | * | 6/2000 | Benson et al. | 264/2.7 |
| 6,396,634 B1 | | 5/2002 | Ishikawa | |
| 6,678,019 B1 | * | 1/2004 | Sato et al. | 349/57 |
| 2002/0075568 A1 | | 6/2002 | Lissotschenko | |
| 2005/0059766 A1 | * | 3/2005 | Jones et al. | 524/431 |

FOREIGN PATENT DOCUMENTS

RU 2183336 C2 6/2002

* cited by examiner

*Primary Examiner*—Ellen E. Kim
(74) *Attorney, Agent, or Firm*—Stephen W. Buckingham

(57) ABSTRACT

A scratch-resistant light directing film has a structured surface with first and second prism elements. The first prism elements are taller than the second prism elements and have blunt tips. The second prism elements are shorter and have sharp tips. The resulting film is scratch-resistant without substantially sacrificing gains in on-axis light.

20 Claims, 3 Drawing Sheets

SCRATCH-RESISTANT LIGHT DIRECTING FILMS

BACKGROUND OF THE INVENTION

The present invention relates to light directing films. In particular, the present invention relates to light directing films having a variable height structured surface.

Light directing films are used to increase the luminance of light exiting an optical display in a direction normal, or "on-axis," to the surface of the display. One type of light directing film has a substantially planar surface and an opposing structured surface, which has an array of linear prism elements. Increasing the amount of on-axis light reduces the amount of energy required to generate a desired amount of on-axis luminance. This is particularly important for optical displays that use battery powered light sources such as those used in laptop computers, calculators, digital wristwatches, cellular phones, and personal digital assistants.

It is known in the art to place two light directing films closely adjacent to each other with the prism elements crossed at approximately 90° relative to each other in order to further increase the amount of on-axis light. However, an optical display using this structure may exhibit visibly apparent bright spots, streaks, or lines. This "wet-out" condition is caused by optical coupling between contacting, or very nearly contacting, surfaces of the adjacent films. To overcome this condition, the prism elements may be arranged in zones of taller and shorter prism elements to limit contact between the films. Representative embodiments of antiwet-out structures are described in U.S. Pat. No. 5,771,328, which is assigned to 3M Company.

The sides of each prism element intersect to form a peak or apex. The peak of the prism element is usually sharp, which is most effective at increasing the amount of on-axis light exiting the backlight. However, the sharp peak formed on each of the prism elements is relatively fragile making the film prone to scratching. This is particularly troublesome when the light directing films are being handled during the manufacture of devices such as those listed above, making it necessary to apply a pre-mask to the film after it is manufactured. The pre-mask protects the film from scratching, but must be subsequently removed prior to installation into an optical display. There is, therefore, a need for a light directing film that is scratch-resistant without substantially sacrificing the performance of the film.

BRIEF SUMMARY OF THE INVENTION

The present invention is a light directing film with a structured surface having taller first prism elements and shorter second prism elements. The taller first prism elements have a blunt tip.

DESCRIPTION

Figure 1:
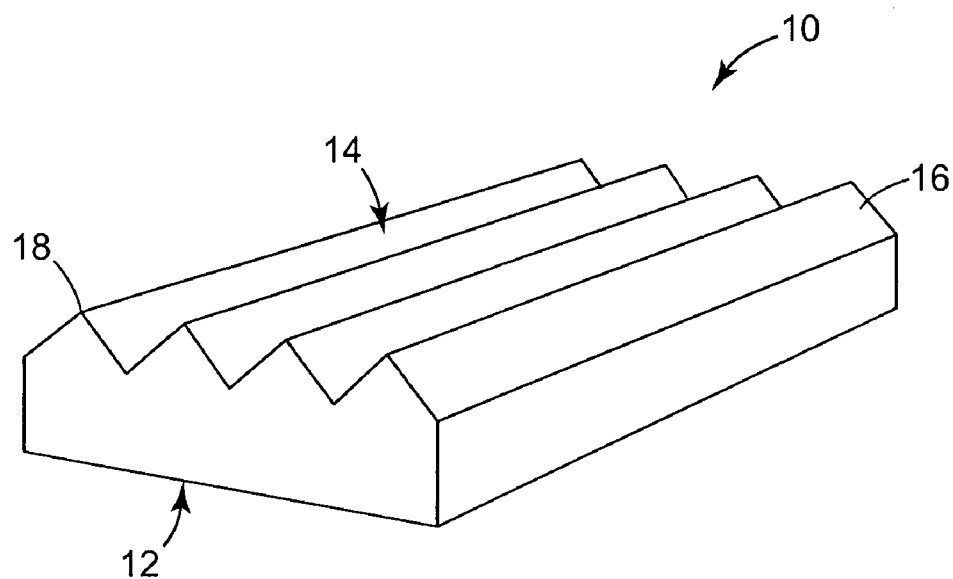
FIG. 1 is a perspective view of a representative embodiment of a light directing film in accordance with the prior art.

FIG. 1 is a representative example of a light directing film 10 in accordance with the prior art. Film 10 includes smooth surface 12, structured surface 14, and prism elements 16 with peaks 18. Smooth surface 12 and structured surface 14 are on opposing sides of film 10. Prism elements 16 are linearly arranged to form structured surface 14. Peak 18 is formed at the top of each prism element 16. As shown in FIG. 1, peak 18 is a sharp tip.

In operation, light that is incident on smooth surface 12 at relatively high incidence angles is refracted at smooth surface 12 and structured surface 14 and is redirected such that it is substantially on-axis, or substantially perpendicular, to smooth surface 12. Light incident on structured surface 14 at angles that are greater than the critical angle undergoes total internal reflection from both sides of prism element 16 and is redirected back through smooth surface 12 where it is recycled by a reflective surface below smooth surface 12. The combination of refraction and total internal reflection increases the amount of on-axis light and decreases the amount of off-axis light.

FIGS. 2, 4, 5, 6, and 7 are representative embodiments of the present invention. These drawings are not to scale. In particular, the size of the structured surfaces are greatly exaggerated for illustrative purposes.

Figure 2:
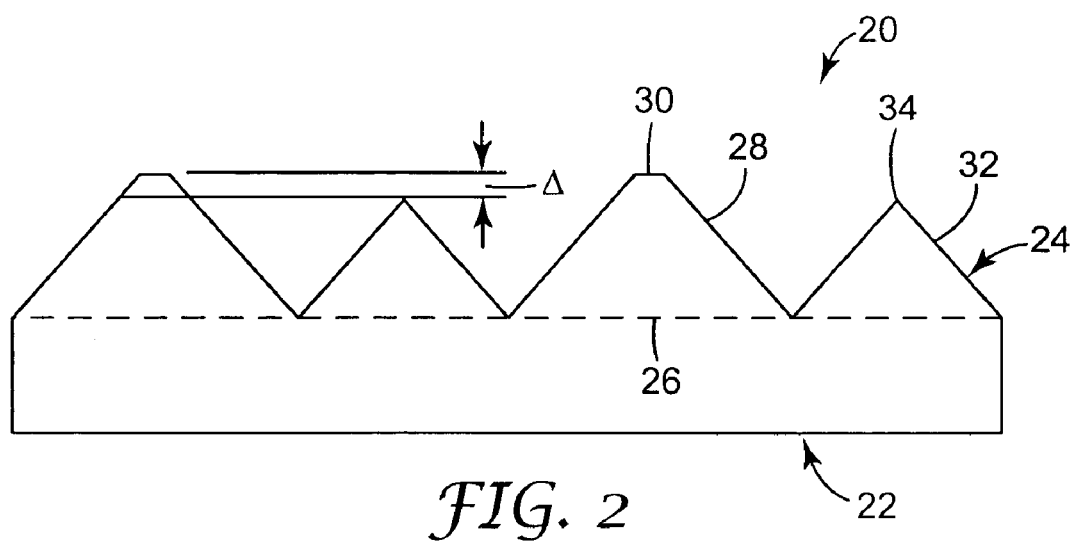
FIG. 2 is a cross-sectional view of one embodiment of a light directing film in accordance with the present invention.

FIG. 2 is a portion of a cross section of a representative embodiment of the present invention. FIG. 2 includes light directing film 20 with smooth surface 22, structured surface 24, and reference plane 26. Structured surface 24 further includes first prism elements 28 with blunt tips 30 and second prism elements 32 with sharp tips 34. FIG. 2 also includes height change Δ.

Again, smooth surface 22 and structured surface 24 are on opposing sides of film 20. Reference plane 26 lies between surfaces 22 and 24. The location of reference plane 26 is arbitrary, and there is no significance to the location chosen here. First and second prism elements 28 and 32 alternate along structured surface 24, and blunt tips 30 and sharp tips 34 are at the tops of first and second prism elements 28 and 32, respectively. Height change Δ indicates the difference in height between first and second prism elements 28 and 32 as measured from reference plane 26 to blunt tip 30 and sharp tip 34, respectively.

Blunt tip 30 is not a sharp tip but, instead, is relatively flat. Blunt tips are less easily damaged, but the gain in on-axis light generated by using a blunt-tip prism element drops versus when using a sharp-tip prism element. Gain in on-axis light is the ratio of luminance with a light directing film to luminance without a film. Sharp tip 34 is damaged more easily but maximizes the gain in on-axis light. First prism elements 28 are taller than second prism elements 32. Therefore, film 20 is arranged such that sharp tips 34 sit below the plane of blunt tips 30 and are less likely to be damaged. The resulting film is scratch-resistant and minimizes the drop in gain of on-axis light, which would occur with all blunt tips.

The actual dimensions of first and second prism elements vary depending on the application of the film. The pitch (the distance from tip-to-tip) or the width of the base of prism elements may vary between first and second prism elements. In addition, these dimensions may vary within first prism elements and/or within second prism elements in the same film. The depth of the grooves or height of the prism elements may also vary within first prism elements and/or within second prism elements on the same film. For example, a film may have some first prism elements that measure 50 μm at the base and 25 μm high, and on the same film have first prism elements that measure 40 μm at the base and 20 μm high. Both of these first prism elements have blunt tips and are taller than the sharp-tipped prism elements on the film. These dimensions assume groove angles of 90°, however, the groove angles may vary and there may be a plurality of different groove angles within a single film.

The height of typical prism elements measures from about 24 μm to about 100 μm. In this height range, height change Δ is preferably about 2 μm to about 10 μm but may be up to 20 μm. In some applications the height of the prism elements may be more, and thus, height change Δ increases. Optimal height change Δ values are determined experimentally for each prism element height, which is varied by changing the depth of the grooves and/or the pitch.

Figure 3A:
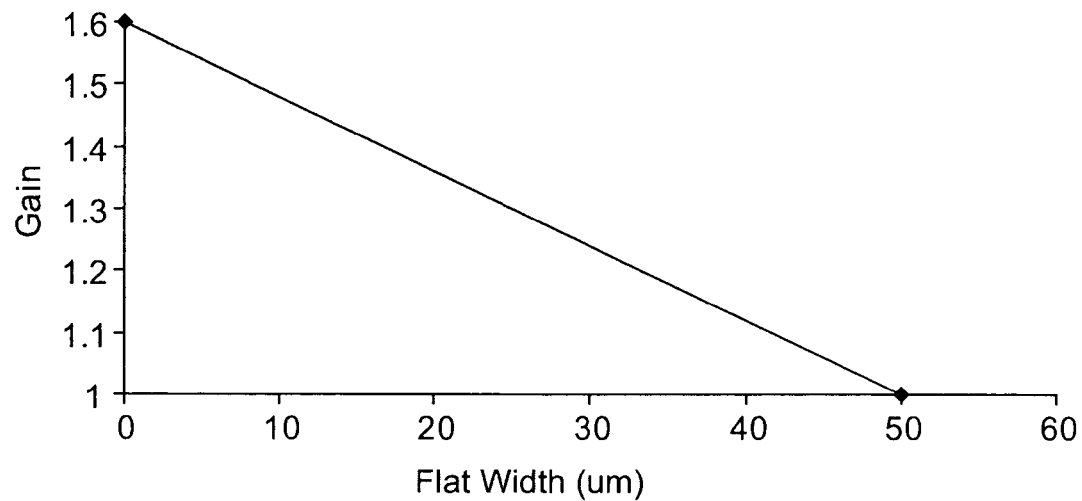
FIGS. 3a and 3b are graphs illustrating the relationship between the width of a blunt tip and on-axis light gain.
Figure 3B:
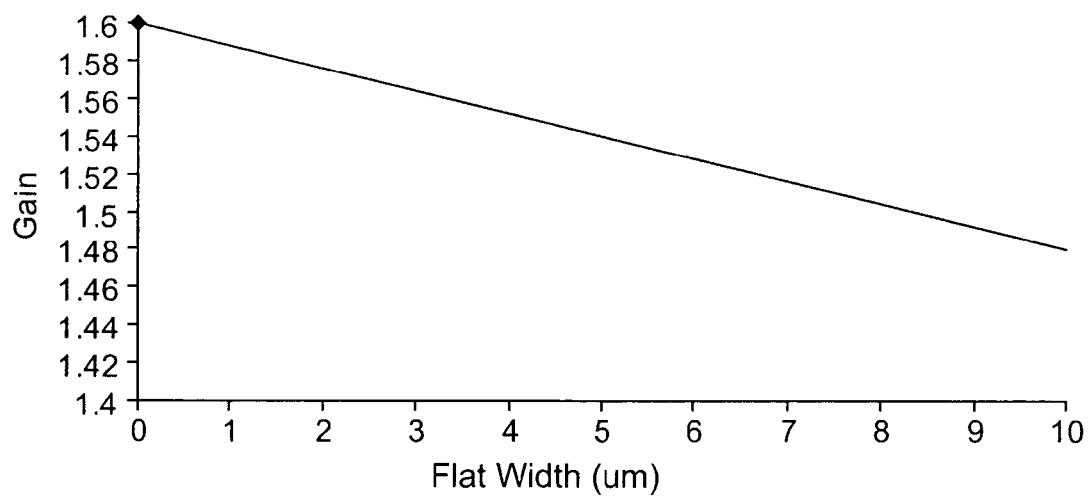

The width of the surface of blunt tip 30 may vary depending on the application of the film. Here again, there may be various combinations of widths of blunt tips 30 within a single film. FIGS. 3a and 3b illustrate the relationship between the width of the surface of blunt tip 30 versus gain of on-axis light for prism elements having a 50 μm pitch. FIG. 3a shows the gain in on-axis light when all prism elements have blunt-tip widths from 0 μm (a sharp tip) to 50 μm (essentially no prism element) for a single light directing film. The actual values of gain in on-axis light will vary slightly between different gain-testers and backlight cavities that are used, but the linear relationship will be the same. FIG. 3b is a blow-up of FIG. 3a to show better resolution of the linear relationship between 0 μm and 10 μm. As is evident from FIGS. 3a and 3b, the gain in on-axis light decreases as the width of blunt tip 30 increases. For prism elements measuring about 50 μm wide at the base with apex angles of about 90° to about 100°, the width of blunt tip 30 is preferably about 1 μm to about 20 μm, or up to about 40% of the width of the base. Again, optimal values for various dimensioned prism elements may be determined experimentally by balancing the sacrifice in gain of on-axis light versus the level of scratch-resistance.

The decrease in gain of on-axis light is also reduced if a plurality of shorter sharp-tipped prism elements are interleaved between the taller, blunt-tipped prism elements. A representative embodiment is shown as light directing film 38 in FIG. 4. Film 38 includes structured surface 40 having first prism elements 28 with blunt tips 30 and second prism elements 32 with sharp tips 34. Here, three second prism elements 32 are interleaved between the first prism elements 28. The resulting film is still scratch-resistant, but the decrease in gain of on-axis light is less than the embodiment shown in FIG. 2.

The decrease in gain of on-axis light is proportional to the number of shorter, sharp-tipped prism elements interleaved between each pair of taller, blunt-tipped prism elements. For example, referring to FIG. 3b, the gain in on-axis light when all prism elements have sharp tips is 1.60, and when all prism elements have a blunt tip measuring 5 μm wide, the gain is 1.54. The gain in on-axis light decreases by 0.06 when utilizing blunt-tipped prism elements. If half of the prism elements are formed with sharp tips, like film 20 shown in FIG. 2, the decrease in gain of on-axis light is reduced by 50% resulting in a gain of 1.57 (versus 1.54 with all blunt-tipped prism elements). Accordingly, if three-quarters of the prism elements have sharp tips, like film 38 shown in FIG. 4, the decrease is reduced by 75% resulting in a gain of about 1.59. The ratio between the number of sharp-tipped prism elements and blunt-tipped prism elements is dependent on visual appearance, optical performance (gain of on-axis light), mechanical stiffness of a beam supported between the blunt tips, and the ability to remain scratch-resistant. These are the only factors that limit the number of shorter, sharp-tipped prism elements that may be interleaved between each pair of taller, blunt-tipped prism elements. Any repeating pattern of prism elements may be used including having zones consisting of a plurality of taller, blunt-tipped prism elements followed by a plurality of smaller, sharp-tipped prism elements, etc.

Figure 4:
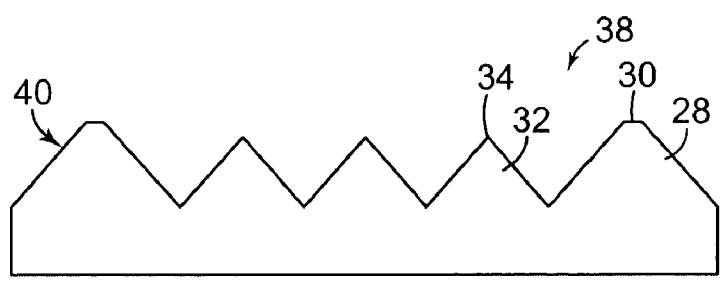
FIG. 4 is a cross-sectional view of another embodiment of a light directing film in accordance with the present invention.
Figure 5:
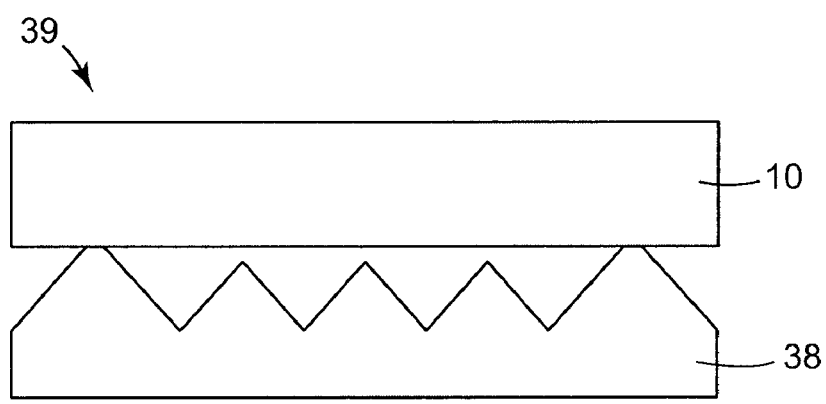
FIG. 5 is a cross-sectional view of a light directing article including a light directing film in accordance with the present invention.

To this end, FIG. 5 shows a light directing article 39, which applies the present invention to an antiwet-out structure. FIG. 5 shows light directing film 10 (FIG. 1) placed over light directing film 38 (FIG. 4). The linear arrays of prism elements of each film are oriented at 90° angles. The taller prism elements, which minimize optical coupling, are formed with blunt tips. Alternatively, another film like film 38 or film 42 of FIG. 6 may be stacked to form a light directing article where both films are scratch-resistant.

Figure 6:
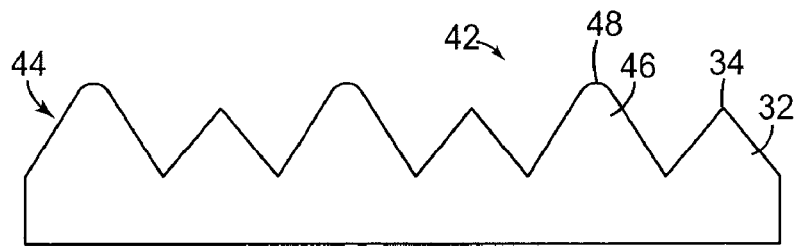
FIG. 6 is a cross-sectional view of another embodiment of a light directing film in accordance with the present invention.

An alternate embodiment is shown in FIG. 6. FIG. 6 shows light directing film 42 having structured surface 44. Structured surface 44 includes second prism elements 32 with sharp tips 34 and third prism elements 46 with blunt tips 48. Second and third prism elements 32 and 46 alternate along structured surface 44.

Here, instead of the taller prism elements having a substantially flat top as shown in FIGS. 2 and 4, the taller prism elements have a curved, or radius, top. Blunt tip 48 functions essentially the same as blunt tip 30, except the relationship between the chord width of blunt tip 48 (the distance between the points where the straight edges of third prism elements 46 meet the curved edge) and gain of on-axis light is not exactly linear. It is similar to the relationship shown in FIGS. 3a and 3b (data not shown). Thus, any form of blunt tip may be used with the present invention.

Figure 7:
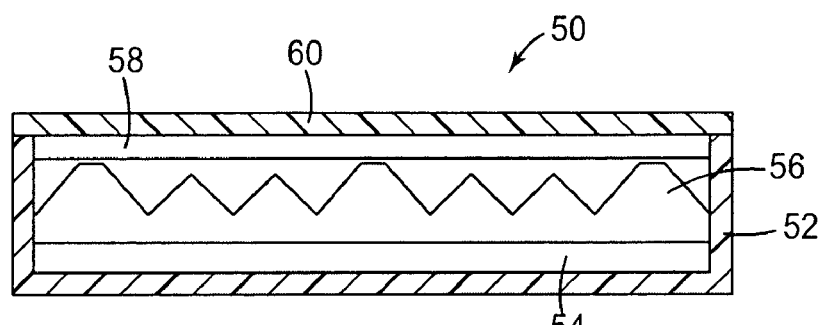
FIG. 7 is a cross-sectional view of an optical display including a light directing film in accordance with the present invention.

FIG. 7 is a cross-section of a representative embodiment of an optical display 50 incorporating a light directing film of the present invention. Display 50 includes case 52, light source 54, light directing film 56, light gating device 58, and cover sheet 60.

As shown in FIG. 7, light source 54 is an electroluminescent panel, however, it will be appreciated that other light sources, such as a fluorescent backlighting assembly commonly used with laptop computers or a passive reflective display commonly used in some calculators, are within the scope of the present invention. Additionally, while light gating device 58 is preferably a liquid crystal device, other light gating devices are within the scope of the present invention. Although exaggerated in FIG. 7, it can be seen that the blunt-tipped prism elements of light directing film 56 are taller than the sharp-tipped prism elements of light directing film 56. Thus, the sharp-tipped prism elements are more protected and less likely to be damaged even when assembled into an optical display.

Light directing films utilizing the present invention inhibit scratches that occur when the film is pulled from side-to-side. Thus, depending on the manufacturing process, the present invention may circumvent the need for applying a pre-mask to the film.

The material that can be used for the films varies. It is essential that the material be substantially transparent to ensure high optical transmission. Examples of useful, commercially available polymeric materials include acrylics and polycarbonates having nominal indices of refraction of about 1.493 and 1.586, respectively. Other useful polymers include polypropylene, polyurethane, polystyrene, polyvinyl chloride, and other like materials. While the particular material is not critical, materials having higher indices of refraction are preferred.

Films in accordance with the present invention may be manufactured by various methods. Conventional methods include using a precision tool, such as a diamond turning tool, to cut a mold in a machinable substrate and replicating the mold using an embossing or UV curing process. Depending upon the manufacturing process, these films are typically between about 4 mils and about 20 mils in thickness.

The invention claimed is:

1. A light directing film comprising:
   a first surface;
   a structured surface opposite the first surface, the structured surface having an array of prism elements, the prism elements having generally parallel tips extending substantially uninterrupted across the structured surface, the array of prism elements further comprising:
     first prism elements having blunt tips and bases, a width of the blunt tips being greater than 0% to less than about 40% of a width of the bases, the blunt tips being disposed at a first distance from a reference plane disposed between the first surface and the structured surface; and
     second prism elements having sharp tips, the sharp tips being disposed at a second distance from the reference plane, the second distance measuring less than the first distance.

2. The light directing film of claim 1 wherein the blunt tip is substantially flat.

3. The light directing film of claim 1 wherein the blunt tip is curved.

4. The light directing film of claim 1 wherein the first prism elements comprise no more than about 50% of the array.

5. The light directing film of claim 1 wherein at least one second prism element is interleaved between a pair of first prism elements.

6. The light directing film of claim 1 wherein the width of the blunt tip measures from about 1 μm to about 20 μm.

7. The light directing film of claim 1 wherein the second distance measures about 2 μm to about 5 μm less than the first distance.

8. A light directing film comprising:
   a first surface; and
   a structured surface opposite the first surface, the structured surface having an array of interleaved first and second prism elements, the first prism elements having bases and generally parallel blunt tips extending substantially uninterrupted across the structured surface and define an outer plane, a width of the blunt tips being greater than 0% to less than about 40% of a width of the bases, the second prism elements having sharp tips that are recessed with respect to the outer plane.

9. The light directing film of claim 8 wherein the sharp tips are recessed about 2 μm to about 5 μm from the outer plane.

10. The light directing film of claim 8 wherein the blunt tips are relatively flat.

11. The light directing film of claim 8 wherein the blunt tips are curved.

12. The light directing film of claim 8 wherein the first prism elements comprise up to about 50% of the array.

13. The light directing film of claim 8 wherein at least one second prism element is interleaved between a pair of first prism elements.

14. A light directing film comprising:
    a first surface; and
    a structured surface opposite the first surface, the structured surface having an array of interleaved first and second prism elements, the first prism elements having bases and generally parallel blunt tips extending substantially uninterrupted across the structured surface that define at least one outer plane, a width of the blunt tips being greater than 0% to less than about 40% of a width of the bases, the second prism elements having sharp tips that define at least one inner plane.

15. A light directing film comprising:
    a first surface; and
    a structured surface opposite the first surface, the structured surface having an array of interleaved first and second prism elements, the first prism elements having bases and generally parallel blunt tips extending substantially uninterrupted across the structured surface that define a plurality of outer planes, a width of the blunt tips being greater than 0% to less than about 40% of a width of the bases, the second prism elements having sharp tips that define a plurality of inner planes, the inner planes being recessed with respect to the outer planes.

16. A light directing article comprising:
    a first light directing film having a first surface, a first structured surface opposite the first surface and a reference plane between the first surface and the first structured surface, the first structured surface having a linear array of first prism elements and second prism elements oriented along a first major axis, the first and second prism elements arranged in a repeating pattern wherein at least one second prism element is interleaved between at least a pair of first prism elements, the first prism elements having bases and generally parallel blunt tips extending substantially uninterrupted across the first structured surface and disposed at a first distance from the reference plane, a width of the blunt tips being greater than 0% to less than about 40% of a width of the bases, and the second prism elements having sharp tips disposed at a second distance from the reference plane that is less than the first distance;
    a second light directing film having a substantially planar surface disposed adjacent the first structured surface of the first light directing film, the second light directing film having a second structured surface opposite the substantially planar surface, the second structured surface having a linear array of prism elements oriented along a second major axis; and
    wherein the first major axis intersects the second major axis at an angle which minimizes optical coupling.

17. An optical display comprising:
    a light source;
    a viewing screen; and
    light transfer means for directing light from the light source to the viewing screen, the light transfer means including at least a first light directing film, the light directing film having a first surface, a structured surface opposite the first surface and a reference plane between the first surface and the structured surface, the structured surface having an array of first prism elements and second prism elements, the first prism elements having bases and generally parallel blunt tips extending substantially uninterrupted across the structured surface and having a width that is greater than 0% to less than about 40% of a width of the bases, and the second prism elements having sharp tips, the blunt tips disposed at a first distance from the reference plane, and the sharp tips disposed at a second distance from the reference plane, the second distance being less than the first distance.

18. The optical display of claim 17 wherein at least one second prism element is interleaved between a pair of first prism elements.

19. The optical display of claim 17 wherein the blunt tips are substantially flat.

20. The optical display of claim 17 wherein the blunt tips are curved.

* * * * *

UNITED STATES PATENT AND TRADEMARK OFFICE
CERTIFICATE OF CORRECTION

| | | |
|---|---|---|
| PATENT NO. | : 7,142,767 B2 | Page 1 of 1 |
| APPLICATION NO. | : 10/750328 | |
| DATED | : November 28, 2006 | |
| INVENTOR(S) | : Mark E. Gardiner | |

It is certified that error appears in the above-identified patent and that said Letters Patent is hereby corrected as shown below:

*Drawings,
In the drawings, Sheet 2, Fig 3a, delete "(um)" and insert -- ($\mu$m) --, therefor.
In the drawings, Sheet 2, Fig. 3b, delete "(um)" and insert --( $\mu$m) --, therefor.

Column 3,
Line 50, after "shorter" insert --, --.

Signed and Sealed this

Nineteenth Day of June, 2007

JON W. DUDAS
*Director of the United States Patent and Trademark Office*